United States Patent [19]

Pitochelli

[11] Patent Number: 5,693,252

[45] Date of Patent: *Dec. 2, 1997

[54] GENERATION OF CHLORINE DIOXIDE IN A NON-AQUEOUS MEDIUM

[75] Inventor: Anthony R. Pitochelli, Kingwood, Tex.

[73] Assignee: Rio Linda Chemical Co., Inc., Sacramento, Calif.

[*] Notice: The term of this patent shall not extend beyond the expiration date of Pat. No. 5,405,549.

[21] Appl. No.: 590,061

[22] Filed: Jan. 17, 1996

Related U.S. Application Data

[63] Continuation of Ser. No. 330,104, Oct. 27, 1994, abandoned, which is a continuation of Ser. No. 67,334, May 25, 1993, abandoned, which is a continuation of Ser. No. 716,638, Jun. 17, 1991, abandoned.

[51] Int. Cl.$^6$ .................................................. C09K 3/00
[52] U.S. Cl. ..................... 252/187.21; 252/187.1; 252/383; 149/1; 423/477; 423/478; 422/40; 422/41; 436/8
[58] Field of Search ................ 252/187.1, 187.21, 252/383; 149/1; 423/477, 478; 422/40, 41; 436/8

[56] References Cited

U.S. PATENT DOCUMENTS

| | | | |
|---|---|---|---|
| 2,436,134 | 2/1948 | Aston et al. | 23/152 |
| 3,084,995 | 4/1963 | Grubitsch et al. | 23/152 |
| 4,105,546 | 8/1978 | Kobayashi et al. | 210/610 |
| 4,786,492 | 11/1988 | Ratcliff | 424/53 |
| 4,793,931 | 12/1988 | Stevens et al. | 210/636 |
| 5,405,549 | 4/1995 | Pitochelli | 252/187.21 |

FOREIGN PATENT DOCUMENTS 60-101195  6/1985  Japan.

OTHER PUBLICATIONS

Quentin et al. Z. Wasser Forsch, "Determination of Chlorine Dioxide and Chlorite in Drinking Water", 1984 pp. 50–62.
Masschelein, *Chlorine Dioxide*: Chemistry and Environmental Impact of Oxychlorine Compounds, Ann Arbor Science Publishers, Ann Arbor, Mich. 1979, pp. 9–11, 123–126 and 138–140.
"Merck Index" S. Budavari et al., published 1989 by Merck & Co. (Rahway, N.J.), see 274 and 276.
Chemical Abstracts, vol. 91, No. 12, Mar. 26, 1979, Abstract No. 96001d, Sowa et al., "Nitrogen Oxide Removal from Acidic Flue Gas".
Chemical Abstracts, vol. 71, No. 15, 1968, Abstract No. 70256c, Jalowiczor Jozef, "Reaction of Chlorine Dioxide with Organic Compounds. XIII. Reaction with Cyclohexane, Benzene, and Toluene".
Morrison & Boyd, Organic Chemistry 4th ed. pp. 93–94 (1980).

*Primary Examiner*—Sharon Gibson
*Assistant Examiner*—Valerie Fee
*Attorney, Agent, or Firm*—Leonard Bloom

[57] ABSTRACT

A method of preparing chlorine dioxide in a non-aqueous liquid is disclosed. An aqueous solution of chlorine dioxide is mixed and agitated with a non-aqueous liquid. The chlorine dioxide is extracted into the non-aqueous liquid. In a preferred embodiment, an aqueous chlorite solution is added to a quantity of non-aqueous liquid. Acid is added to the aqueous phase to generate chlorine dioxide. The phases are vigorously agitated to extract the chlorine dioxide into the non-aqueous phase. High concentrations of very pure chlorine dioxide are obtainable. In another preferred embodiment, chlorine is prepared in a non-aqueous liquid and is mixed and agitated with an aqueous chlorite solution. Separation of the aqueous and non-aqueous phases provides pure solutions of chlorine dioxide in the non-aqueous liquid. Very pure aqueous solutions of chlorine dioxide are prepared by mixing and agitating non-aqueous solutions of chlorine dioxide with water. A reactant useful in oxidation, synthesis, disinfecting and sterilizing comprising chlorine dioxide dissolved in a non-aqueous liquid is disclosed.

11 Claims, 4 Drawing Sheets

GENERATION OF CHLORINE DIOXIDE IN A NON-AQUEOUS MEDIUM

This application is a continuation of Ser. No. 08/330,104, filed Oct. 27, 1994, now abandoned, which is a file wrapper continuation of Ser. No. 08/067,334, filed May 25, 1993, now abandoned, which is a continuation Ser. No. 07/716,638, filed Jun. 17, 1991, now abandoned.

FIELD OF THE INVENTION

This invention relates to chlorine dioxide, a process for the generation of chlorine dioxide and more particularly for chlorine dioxide in a non-aqueous medium.

BACKGROUND OF THE INVENTION

Chlorine dioxide is a highly active chemical which has been widely used in a variety of processes and especially in disinfecting, sterilizing and bactericidal applications. Due to the unstable nature of gaseous chlorine dioxide when compressed, it is commonly prepared on site rather than having it placed in a container and shipping the container for usage at a site when and where needed. Liquid chlorine dioxide is considered to be very hazardous and is generally avoided.

The prior art discloses numerous procedures and generators for the preparation of chlorine dioxide. A partial listing of these are as follows:

| U.S. Pat. No. | Inventor  | Issued            |
|---------------|-----------|-------------------|
| 2,323,594     | Hampel    | July 5, 1943      |
| 2,436,134     | Aston     | February 7, 1948  |
| 2,484,402     | Day et al | October 11, 1948  |
| 4,081,520     | Swindells | March 28, 1978    |
| 4,250,144     | Rategan   | February 10, 1981 |
| 4,247,531     | Hicks     | January 27, 1981  |
| 4,590,057     | Hicks     | May 20, 1986      |
| 4,861,514     | Hutchings | August 29, 1989   |

All current commercial processes for generation of chlorine dioxide involve methods for combining sodium chlorate or sodium chlorite with acids or oxidizing agents in aqueous systems. The chlorine dioxide produced is isolated as an aqueous solution with concentrations varying from a few parts per million to over 9,000 parts per million. The process leading to this latter high concentration is an exception, and involves a recirculating loop to add new chlorine dioxide values to solutions already containing freshly generated chlorine dioxide.

U.S. Pat. No. 2,678,922 prepares an aqueous solution of chlorine dioxide and flushes the chlorine dioxide from the solution with air. The chlorine dioxide-air stream is passed through liquid chlorine to provide a liquid chlorine/chlorine dioxide solution. The only other non-aqueous solutions of chlorine dioxide of which I am aware are U.S. Pat. Nos. 3,036,270 and 3,084,995 in which chlorine dioxide gas is dissolved in liquid carbon dioxide. The latter reference states that it has been proposed to prepare chlorine dioxide in carbon tetrachloride but this has not proven to be successful due to the slight solubility of chlorine dioxide and because of spontaneous decomposition.

Furthermore, the use of organic materials with chlorine dioxide is generally avoided. Hampel does report the reaction of aqueous chlorate solutions with aqueous solutions of aldehydes to produce chlorine dioxide. Aston reports the "unexpected" reactions of organic acid anhydrides with aqueous solutions of chlorates to produce chlorine dioxide. The *Merck Index*, Tenth Edition, 1983 provides several references to the preparation of chlorine dioxide but provides the italicized warning "reacts violently with organic materials."

Thus, despite the interest in chlorine dioxide and the numerous methods of generating chlorine dioxide, the preparation and use of chlorine dioxide in a water-immiscible phase has not been disclosed. In fact, the prior art very strongly teaches away from such a preparation.

SUMMARY OF THE INVENTION

Accordingly, it is a primary object of the present invention to provide a method of preparing chlorine dioxide in a liquid which is non-aqueous.

It is a further object of the present invention to provide chlorine dioxide of a very high purity dissolved in a non-aqueous liquid hydrocarbon.

It is yet another object of the present invention to provide a very efficient, high yield method of preparing chlorine dioxide.

It is still another object of the present invention to provide a simple, rapid method for preparing chlorine dioxide.

It is an additional object of the present invention to provide a stable solution of chlorine dioxide in a non-aqueous medium, said solution being useful as a reactant in oxidation, organic synthesis and for sterilizing and disinfecting purposes.

It is a still further object of the present invention to provide a method to obtain a highly purified aqueous solution of chlorine dioxide.

In accordance with the broad teachings of the present invention, there is herein illustrated and described, a method of preparing chlorine dioxide in a non-aqueous medium comprising the steps of preparing an aqueous solution of chlorine dioxide adding a non-aqueous liquid hydrocarbon to the aqueous solution of chlorine dioxide thereby forming an aqueous phase and a non-aqueous phase. The non-aqueous liquid is substantially immiscible with water and is non-reactive with chlorine dioxide. The liquid phases are agitated wherein the chlorine dioxide is extracted into and dissolved in the non-aqueous phases. The chlorine dioxide is of very high purity substantially free of chlorine and water soluble ionic salts.

In a preferred embodiment, an aqueous solution of approximately 25% by weight of chlorite is diluted to a desired concentration with a desired amount of water. The non-aqueous liquid is added to the aqueous chlorite solution forming an aqueous phase and a non-aqueous phase. A desired amount of hydrochloric acid is added to the aqueous phase, reacting with the chlorite forming chlorine dioxide. The liquid phases are agitated wherein the chlorine dioxide is extracted into and dissolved in the non-aqueous liquid phase. The non-aqueous liquid may be an aliphatic organic liquid, an aromatic organic liquid or a mixed aliphatic and aromatic organic liquid.

In another preferred embodiment, the aqueous solution is approximately 0.5% to 12.5% by weight of chlorite. Chlorine is dissolved in a non-aqueous liquid which does not react with either chlorine or chlorine dioxide and which is substantially immiscible with water. The aqueous and the non-aqueous liquids are mixed and agitated wherein the chlorine solution is separated from the non-aqueous solution, the non-aqueous solution having dissolved therein a high purity of chlorine dioxide.

These and other objects of the present invention will become apparent from a reading of the following specification, taken in conjunction with the enclosed drawings.

DESCRIPTION OF THE PREFERRED EMBODIMENTS

The present invention represents a departure from all other existing processes in that the chlorine dioxide is generated in an aqueous system, but immediately extracted into a water immiscible non-aqueous liquid hydrocarbon such as a non-aqueous solvent. It is also a departure from all other existing methods in that it rapidly and easily leads to the formation of solutions of chlorine dioxide in non-aqueous liquids at concentrations far higher than obtainable in water. It also represents a departure from all other systems in that the chlorine dioxide produced is very pure, and free of chlorite, chlorate, and hydrogen ion, none of which are soluble in non-polar organic solvents. Furthermore, the solutions generated are acid free (the concept of pH has no meaning in non-aqueous systems).

The non-aqueous liquid must be substantially immiscible with water in that the liquid and the water are readily separated. The non-aqueous liquid may have a density greater than or less than water, to permit rapid separation. It is immaterial to the process whether, after separation, the aqueous phase is the upper layer or the lower layer of the two liquids.

Figure 1:
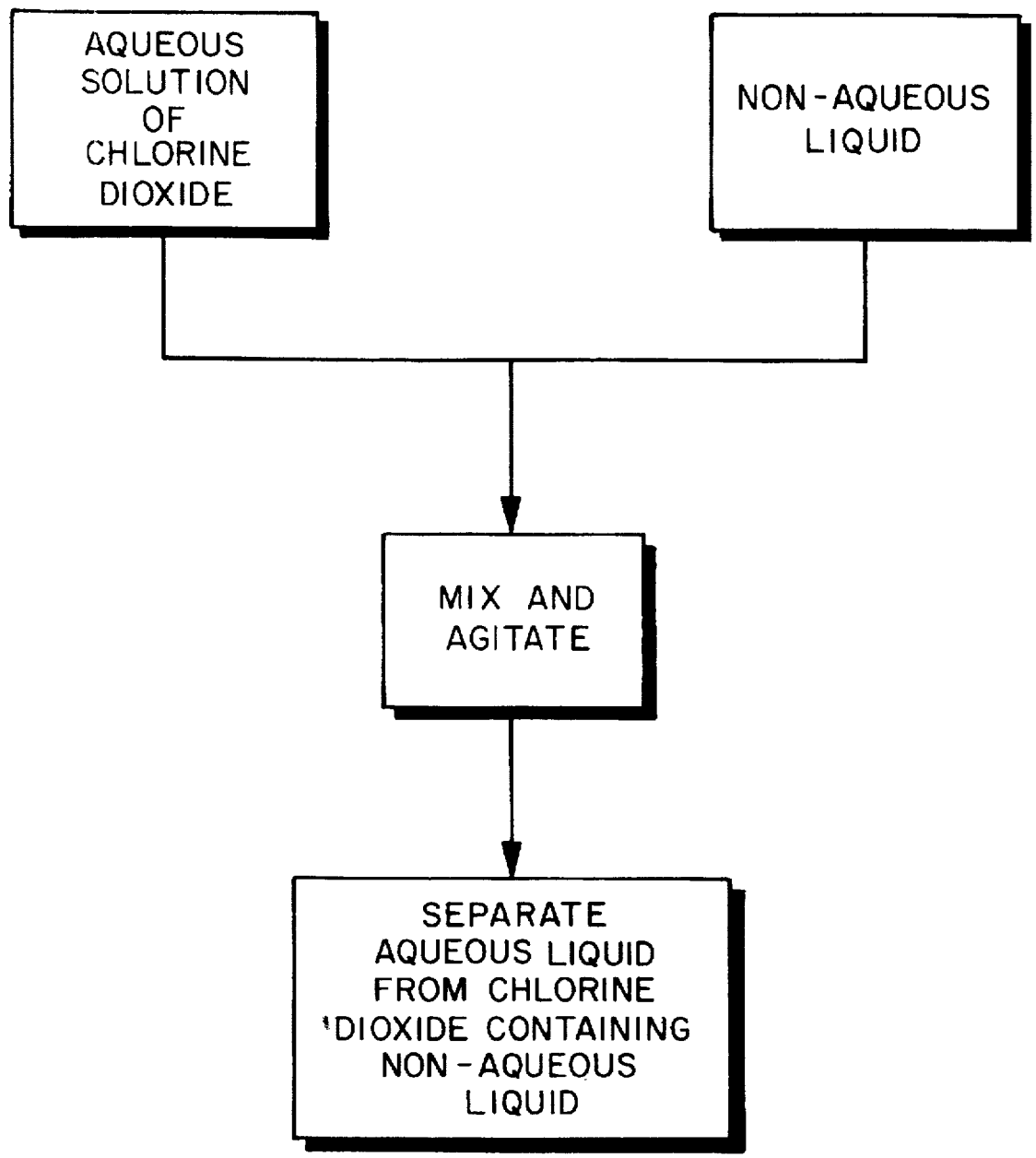
FIG. 1 is a block diagram showing the method of generating chlorine dioxide by the present invention.

Referring now to FIG. 1, the process comprises the providing of an aqueous solution of chlorine dioxide and providing a quantity of the non-aqueous liquid. The two liquids are mixed and agitated vigorously to effectively extract and dissolve the chlorine dioxide in the non-aqueous liquid. The aqueous liquid phase is then separated from the non-aqueous liquid phase to obtain the chlorine dioxide in the non-aqueous liquid.

The two phases referred to above are a water phase containing the ionic inorganic reactants which combine to form chlorine dioxide, and a water immiscible organic phase which acts to extract the uncharged molecular chlorine dioxide as formed. The organic phase performs two functions simultaneously; it acts to receive and dissolve the chlorine dioxide as generated in the aqueous phase, and it acts to separate chlorine dioxide from the inorganic precursors and by-products to lead to a contaminant free solution of chlorine dioxide with a purity unavailable from aqueous-only systems.

Figure 2:
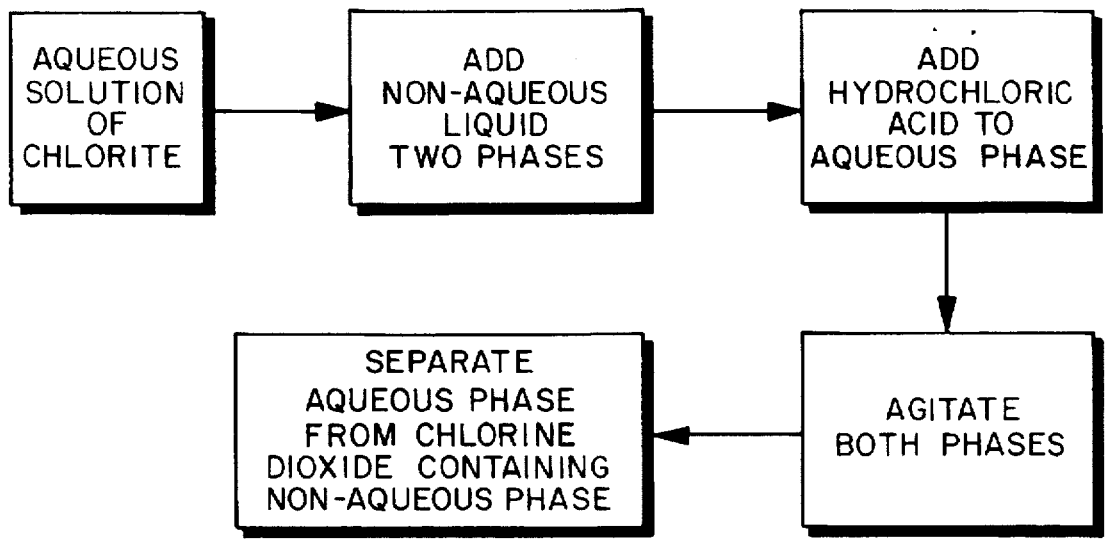
FIG. 2 is a block diagram showing a preferred method of generating chlorine dioxide of the present invention.

In a preferred embodiment, (FIG. 2) the process involves the addition of a water immiscible liquid with which the generated chlorine dioxide does not react, such as hexane, cyclohexane octane, benzene, xylene, or toluene, (gasoline, diesel, and heavy aromatic naphtha also are usable, but the chlorine dioxide reacts with each over a period of hours) to an aqueous solution of chlorite (preferably sodium chlorite) varying in concentration from less than 0.5% to 25%. The organic solvent forms a separate phase from the water. Sodium chlorite is insoluble in the organic solvent, and remains in the water phase. The water phase is then acidified with hydrochloric acid, sulfuric acid, or any acid known to persons skilled in the art. Yellow chlorine dioxide is immediately formed, and by vigorous mixing, is extracted preferentially into the organic phase. The more concentrated the aqueous phase, the greater the partitioning into the organic phase. Unreacted sodium chlorite, acid, and by-product sodium chloride are insoluble in the non-polar organic phase and remain in the water phase, leading to contaminant free chlorine dioxide.

The reaction of acid with aqueous sodium chlorite to produce chlorine dioxide is well known and does not constitute a new part of this invention. Maximum conversion of chlorite to chlorine dioxide from reaction of these two precursors is 80%. Other chlorites known to persons skilled in the art may be used in place of sodium chlorite. Sodium chlorite is provided as an example herein because of its ready availability and its comparatively low cost.

Under certain conditions, the reaction of chlorite with acid is known to produce chlorine as well as chlorine dioxide, chlorine being an undesirable product of a competing reaction. Chlorine reacts with many substances to produce chlorinated by-products, many of which are environmentally undesirable. Some of these chlorinated substances act as catalyst poisons. Further, chlorine is a less effective biocide than chlorine dioxide, the latter being two to four times more effective. This is especially important in commercial use of chlorine dioxide when diluted biocide is used. Unless high purity chlorine dioxide is available, which is free of comparatively high concentration of chlorine, the effectiveness of the sterilization and/or disinfecting procedure may be reduced. In addition, chlorine is much more corrosive than chlorine dioxide, especially in the presence of water.

In this two-phase process, the organic solvent is added to the aqueous chlorite solution and forms a discrete layer above or below the water, depending on its density. A volume of concentrated hydrochloric acid is added in one portion to the aqueous layer resulting in the formation of chlorine dioxide along with some by-product chlorine.

Both the chlorine dioxide and chlorine are soluble in the organic solvent and by means of vigorous agitation of the two liquid phases, an intimate mixture is created which allows the two molecular gases to be extracted and dissolved in the organic layer.

The chlorine dioxide is extracted in finished form. The chlorine is extracted as the chlorine molecule $Cl_2$, in which form it is free to react with unconverted chlorite remaining in the aqueous phase. The method of producing chlorine dioxide by reacting chlorine with an aqueous solution of a metal chlorite, is disclosed in U.S. Pat. No. 4,590,057.

This reaction results in removal of chlorine from the aqueous layer and conversion of chlorite to more chlorine dioxide by the following well-known route:

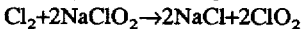

$Cl_2 + 2NaClO_2 \rightarrow 2NaCl + 2ClO_2$

By subjecting the two phases to sufficient agitation, to form an intimate mixture between the aqueous and non-aqueous organic phases, the chlorine dissolved in the organic phase can contact and react with the chlorite anion in the aqueous phase to generate more chlorine dioxide and consume by-product chlorine, leaving the organic phase chlorine-free.

Since water soluble ionic salts such as sodium chlorite precursor, hydrochloric acid, sodium chloride by-product, or any hypochlorite formed by reaction of generated chlorine with water cannot dissolve and be extracted by the organic phase, the resulting organic solution of chlorine dioxide is extremely pure.

The volume of non-aqueous solvent, such as hexane, ranged from 83% of the volume of the aqueous phase to 400% the volume of the aqueous phase. Examples: 10 ml 25% chlorite, 40 ml water, plus 10 ml 15% hydrochloric acid extracted with 50 ml hexane; 10 ml 25% chlorite, plus 10 ml water, plus 5 ml 37% hydrochloric acid extracted with 100 ml hexane. The former system gave hexane solutions of extremely pure chlorine dioxide of 7824 mg/liter, whereas the latter gave a very pure solution with a concentration of 10,792 mg/liter. Addition of salt (sodium chloride) in excess of saturation to the latter allowed increased extraction to a solution having a chlorine dioxide concentration of 11,288 mg/liter, also with extremely high purity.

The following yields were obtained by the extraction process with non-aqueous liquid hydrocarbons as listed (without addition of sodium chloride). These data do not represent the maximum concentration obtainable with the respective non-aqueous liquid hydrocarbon.

| Non-Aqueous Liquid | mg $ClO_2$/liter | % Theoretical* |
|---|---|---|
| Hexane | 10,972 | 59.0 |
| Cyclohexane | 11,264 | 60.5 |
| Octane | 1,822 | 9.7 |
| Benzene | 17,335 | 93.2 |
| Toluene | 5,059 | 27.2 |
| Xylene | 8,836 | 47.5 |
| Gasoline | 12,816 | 68.9 |
| Diesel | 4,182 | 22.4 |
| Heavy Aromatic Naphtha | 17,200 | 92.5 |

*Theoretical yield: 18600 mg/l for the volumes of reactants employed.

These concentrations of chlorine dioxide are significantly greater than have been reported by any of the references as being obtainable in aqueous solutions.

If properly stored away from exposure to light, the non-aqueous solution of chlorine dioxide is stable for a period of at least one month.

The method of analysis was that of Aieta et al (Journal Amer. Water Works Assn., Vol. 96, pp. 64–70, January 1984). In this method, the sample containing chlorine dioxide is added to a mixture of solid potassium iodide crystals and pH 7 buffer. The chlorine dioxide oxidizes iodide to iodine, and the formed iodine is titrated with 0.1 Normal sodium thiosulfate (NST). Either a starch/iodine or amperometric endpoint is used to determine equivalence. The chlorine dioxide is reduced to chlorite ion, which is not an oxidant at pH 7. Any oxidant detected at pH 7 will be only chlorine dioxide or unreacted contaminating chlorine. The contents of the titration container are acidified to pH 1.5–2, by adding dilute hydrochloric acid. This activates the chlorite formed in the first step of the titration and causes it to oxidize the contained iodide ion, restoring the blue starch/iodine color (or activating the meter on the amperometric titrator). Each chlorite ion requires four electrons to neutralize it. Because of the relative oxidation capacities of chlorine dioxide and chlorite, the second titration should require four times the titrant required for the first if the chlorite present comes solely from chlorine dioxide. Therefore, the closer the ratio of the second titration volume to the first titration volume is to 4, the higher the purity of the chlorine dioxide. A value above 4 indicates excess chlorite present during the pH 7 titration (not possible in this process because the chlorite anion will not extract into the hexane, which automatically gives chlorite-free chlorine dioxide, a major processing advantage). A value below 4 indicates there was chlorine impurity present during the pH 7 titration.

EXAMPLE I

The following materials are provided:
1. 25% by weight aqueous solution of chlorite such as commercial grade sodium chlorite.
2. Additional water.
3. Concentrated hydrochloric acid (37%).
4. A substantially water immiscible non-aqueous liquid hydrocarbon (organic solvent) such as:

hexane cyclohexane octane benzene toluene xylene gasoline diesel heavy aromatic naphtha (a common solvent used in the petroleum industry)

The water immiscible solvent is added to the aqueous chlorite solution of the desired concentration. Acid is added to the aqueous chlorite solution of the desired concentration. Acid is added to the aqueous phase and the liquid phase are vigorously agitated. The aqueous and non-aqueous phases are separated.

The range of chlorite solutions used was from 1 ml in 49 ml water (0.5%) to 10 ml chlorite plus 10 ml water (12.5%). Concentrations up to 25% may be used if adequate safety precautions are taken.

In this respect, it should be carefully noted that the chlorine dioxide is light sensitive and spontaneously reacts exothermically to produce chlorine and oxygen. The induction period varies as a function of the solvent and the amount of oxygen present in the atmosphere above the organic base. With hexane, the time was approximately 1–5 minutes and with cyclohexane, the time was 15–30 minutes. It is highly recommended that the procedure herein be conducted in a light-free environment or that, if glass containers are used, that the glass be colored to significantly reduce the exposure of chlorine dioxide to light.

The concentration range used for the hydrochloric acid added was from 15% to full strength (37%).

The pH range over which hexane extractions were successful from the three component mixture, 25% chlorite, water, and hydrochloric acid, was 0.72 for the very dilute systems, to 0.24 for the system employing 10 ml 25% chlorite, 10 ml water and 5 ml concentrated (37%) hydrochloric acid. Early indications are that additional acid (another 5 ml of 37% acid) in this system does not increase yield significantly. The purity of the chlorine dioxide from the very dilute preparation was below the high purity easily achieved with the more concentrated systems; the extractant from acidified 0.5% chlorite had significant chlorine impurity even after aggressive agitation, so it appears chlorite concentration is an important factor influencing chlorine dioxide purity from this process.

The non-aqueous liquid may be an aliphatic, an aromatic, or a mixture of aliphatic and aromatic liquids. The criteria for the non-aqueous liquid is that it be substantially immiscible with water, substantially non-reactive with chlorine dioxide and substantially non-reactive with chlorine. The non-aqueous liquid is not limited to the liquids described herein but these liquids are listed as having been found to be satisfactory.

Figure 3:
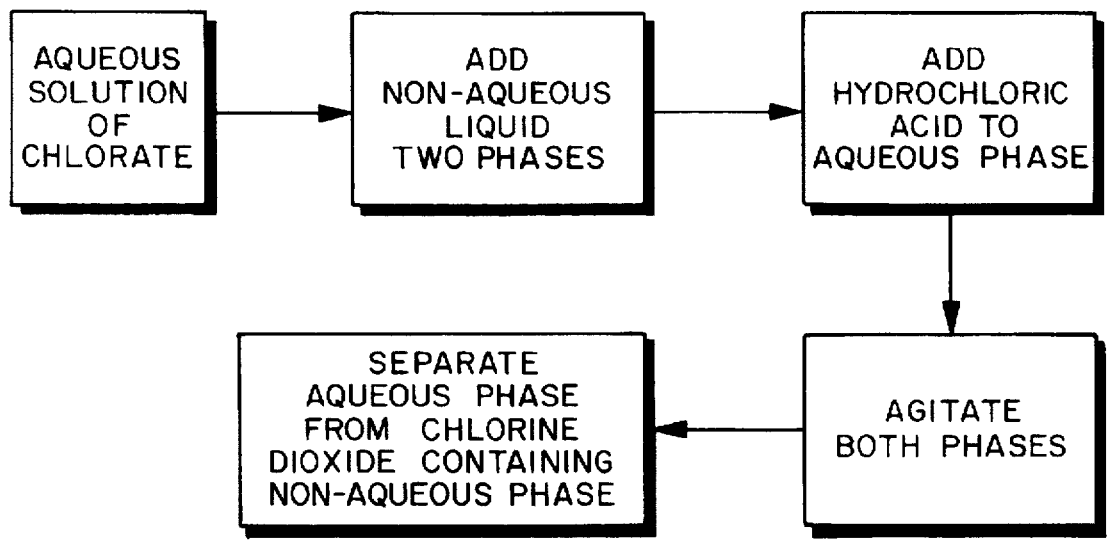
FIG. 3 is a block diagram showing an alternate method of generating chlorine dioxide by the present invention.

The method of preparation of chlorine dioxide in the aqueous phase is not limited to the reaction of chlorite with acid (FIG. 3). For example, chlorine dissolved in water (hypochlorous acid) reacts with chlorite (U.S. Pat. No. 4,250,144). Molecular chlorine reacts directly with sodium chlorite solutions. Chlorates have also been widely used for preparation of chlorine dioxide. An electrolytic cell process wherein sodium chlorate is reacted with hydrochloric acid and heat is disclosed in U.S. Pat. No. 3,920,801. Chlorine dioxide is produced by the reaction of sodium chlorate, sulfuric acid and methanol in U.S. Pat. No. 4,081,520. Any method of producing an aqueous solution of chlorine dioxide known to persons skilled in the art may be used in the process of the present invention. However, procedures which are less efficient in the production of chlorine dioxide and which also produce chlorine as a by-product, are less desirable where high purity chlorine dioxide is desired. This is because the chlorine is also soluble, to varying extents, in the non-aqueous liquid.

Figure 4:
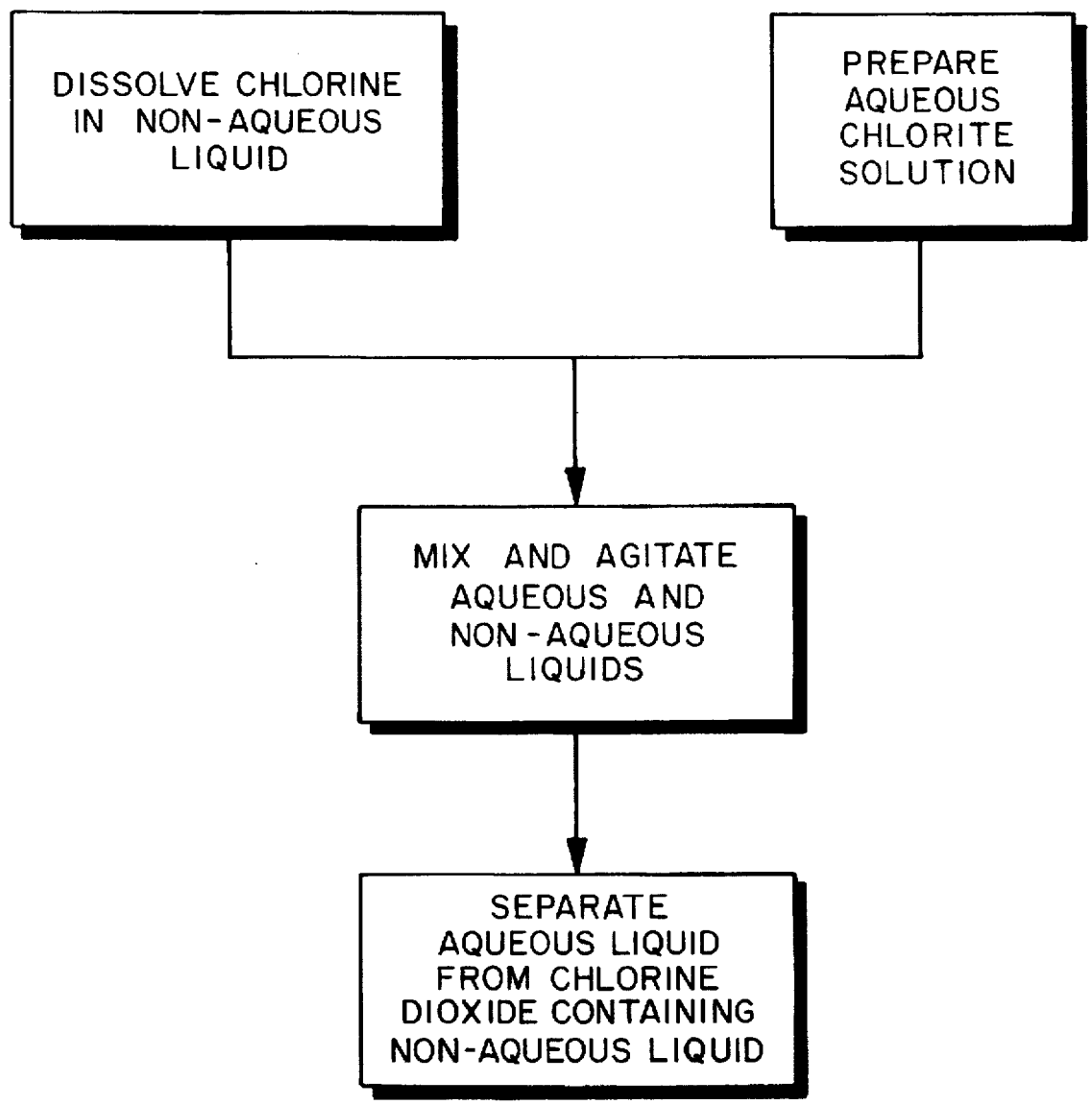
FIG. 4 is a block diagram showing another preferred method of generating chlorine dioxide by the present invention.

In another preferred embodiment, as shown in FIG. 4, a solution of chlorine is prepared in the non-aqueous, substantially water immiscible liquid with which chlorine is substantially non-reactive. An aqueous solution of chlorite is provided and the aqueous liquid is mixed and agitated with the non-aqueous liquid. Chlorine dioxide is formed by the reaction of chlorine with chlorite.

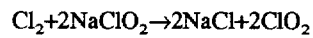
$Cl_2 + 2NaClO_2 \rightarrow 2NaCl + 2ClO_2$

The chlorine dioxide is dissolved and extracted with the non-aqueous liquid in high concentration.

EXAMPLE II

A 10 ml volume of 12.5% sodium hypochlorite was added to 40 ml of distilled water to make a total of 50 ml solution in a separatory funnel, and 50 ml of hexane added to the funnel.

A 5 cc portion of 15% hydrochloric acid was added to the two phase system in the funnel, and the mixture agitated vigorously. Yellow molecular chlorine was formed by the reaction of hypochlorite with acid. (The mixing of hypochlorite with acid is a standard method for chlorine preparation of chlorine gas).

The aqueous layer was discarded. To the intensely yellow hexane solution of chlorine was added a solution composed of 10 ml 25% sodium chlorite plus 40 ml distilled water. The mixture was shaken vigorously for approximately five minutes to give the molecular chlorine in hexane sufficient opportunity to mix intimately with the aqueous chlorite solution. The chemistry for the reaction between chlorine and chlorite is well known except that in the prior art, free gaseous chlorine is contacted with the chlorite, whereas in the present invention, the molecular chlorine is present as a gas dissolved in hexane.

The aqueous layer containing unreacted chlorite and sodium chloride by-product is discarded. The hexane layer contains chlorine-free chlorine dioxide.

Analysis of this solution is used to determine both the chlorine dioxide concentration, and the purity. The method employed is the method of Aieta, et al.

In analyzing the sample prepared above, the first titration required 1.15 ml of 0.1N NST. After acidification, the second titration required 4.62 ml of 0.1N NST. This gave a ratio of 4.62/1.15=4.017, indicating the produced chlorine dioxide was very pure. The chlorine dioxide concentration of the hexane solution was 7757 mg/liter.

As described above under Example I, the alternate embodiment of Example II also provides highly purified chlorine dioxide free of chlorites, chlorates, hypochlorites, acid and water soluble ionic salts since these reactants and by-products are soluble in water and insoluble in the non-aqueous phase. Further, excess chlorite in the aqueous phase and continued extraction permits further reaction with the chlorite of any residual chlorine in the non-aqueous phase to increase the efficiency and the yield of the process. The higher the concentration of chlorite in the aqueous phase, the more rapid is the reaction with molecular chlorine. In addition, as previously described, addition of sodium chloride to the aqueous phase also increases the yield of chlorine dioxide.

Safety precautions in handling chlorine dioxide and exposure to light are equally pertinent to chlorine dioxide prepared by the above disclosed procedure.

Figure 5:
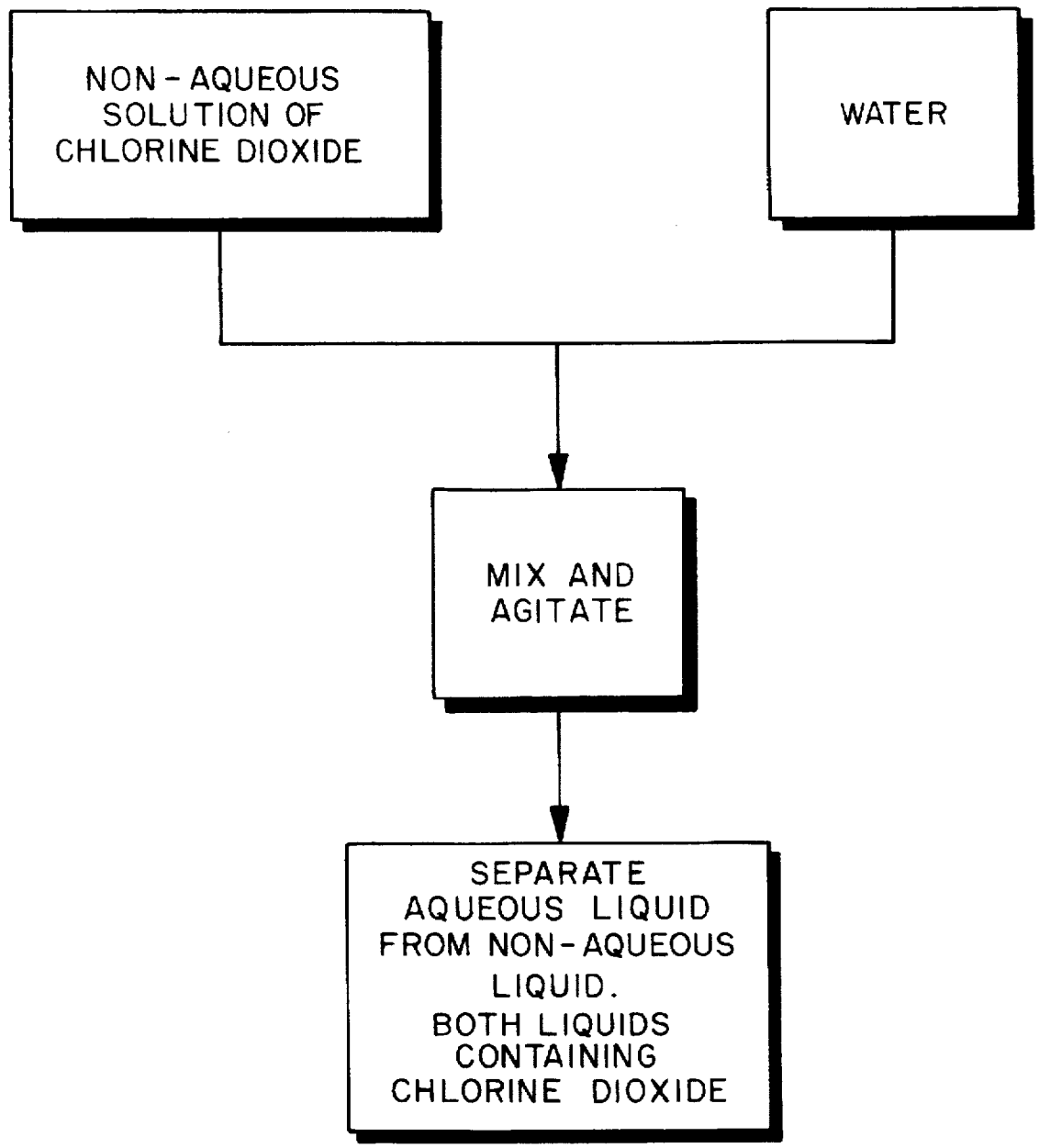
FIG. 5 is a block diagram showing a method of preparing an aqueous solution of chlorine dioxide by the present invention.

The non-aqueous solution of highly purified chlorine dioxide may further be used to prepare very pure aqueous solutions of chlorine dioxide (FIG. 5). The non-aqueous solution of chlorine dioxide is mixed and vigorously agitated with water. In a preferred method, an equal volume of distilled water is used. Depending upon the particular non-aqueous liquid used, and the preferential solubility of chlorine dioxide in the water vs. the selected solvent, varying concentrations of chlorine dioxide in water may be obtained.

EXAMPLE III

Extraction of 100 ml of hexane containing 9105 mg/l chlorine dioxide dissolved therein with 100 ml of distilled water resulted in formation of an aqueous solution containing 4722 mg/l chlorine dioxide, leaving a hexane solution containing 3912 mg/l chlorine dioxide. After mild acidification (to approximate pH 5.0 with hydrochloric acid) and seven days storage in brown glass, the aqueous solution contained 4788 mg/l chlorine dioxide. The apparent increase in concentration of chlorine dioxide in the aqueous solution is due to the experimental error and accuracy of the analytical method.

Extraction of the non-aqueous liquid containing chlorine dioxide with distilled water is preferred since the presence of salts and dissolved substances in the water decreases the solubility of chlorine dioxide in the aqueous phase. With some solvents, chlorine dioxide has been found to be more soluble in pure water than in the non-aqueous liquid; that is the partition favors pure water over pure solvent. The relative volume of the aqueous phase compared to the non-aqueous phase is not critical for extraction into the water but is a factor with respect to the amount of chlorine dioxide which the aqueous phase is capable of dissolving.

The advantage of this method of preparing aqueous solutions of chlorine dioxide over methods previously disclosed in the prior art is that the chlorine dioxide is pure and the aqueous solution has no chlorine, chlorites, chlorates, hydrochlorates or other reaction precursors or by-products present. Also, the chlorine dioxide can be obtained at a relatively high concentration. Of course, the solution can be further diluted with water if a lower concentration is desired. Further, if properly stored, the aqueous solution is stable for at least seven (7) days with substantially no reduction in the concentration of the chlorine dioxide.

These methods, therefore, represent a rapid, new means to obtain pure solutions of high concentrations of chlorine dioxide in organic solvents. These methods open up new routes to the use of chlorine dioxide as a reactant in non-aqueous organic synthesis, as well as a means to production of chlorine dioxide in a form never available before, in which form it may serve both as a reactant and as an oxidant in water-free systems. Further, an even wider use can be found for chlorine dioxide as a biocide and a sterlizing and disinfecting agent.

These methods also represent means for making chlorine dioxide available to any chemist equipped with the most rudimentary chemical equipment, so that any chemist skilled in the most basic arts of chemistry and taking adequate precaution can now make pure, chlorine- and chlorite-free solutions of chlorine dioxide for investigative or commercial purposes.

The methods also represent means for manufacturing high concentration solutions of chlorine dioxide in organic solvents which may have commercial value in and of themselves. A method for preparation of aqueous chlorine dioxide of high purity and excellent storage stability is disclosed.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A reagent for oxidation, synthesis, disinfecting and sterilizing consisting essentially of chlorine dioxide dissolved in a non-aqueous, water-immiscible liquid hydrocarbon, the non-aqueous liquid hydrocarbon with the chlorine dioxide dissolved therein being stored at atmospheric pressure in a storage container which avoids exposure to light and, wherein the concentration of chlorine dioxide is disinfecting and sterilizing, and ranges from approximately 1,822–17,335 mg. per liter of the non-aqueous water-immiscible liquid hydrocarbon, the chlorine dioxide being substantially free of chlorine and water soluble ionic salts.

2. The reagent of claim 1, wherein the non-aqueous, water-immiscible liquid hydrocarbon is an aliphatic organic liquid.

3. The reagent of claim 2, wherein the aliphatic organic liquid hydrocarbon is selected from the group consisting of hexane, cyclohexane and octane.

4. The reagent of claim 1, wherein the non-aqueous, water-immiscible liquid hydrocarbon is an aromatic organic liquid hydrocarbon.

5. The reagent of claim 4, wherein the aromatic organic liquid hydrocarbon is selected from the group consisting of benzene, toluene and xylene.

6. The reagent of claim 1, wherein the non-aqueous, water-immiscible liquid hydrocarbon is a mixed aliphatic and aromatic organic liquid hydrocarbon.

7. The reagent of claim 6, wherein the mixed aliphatic and aromatic organic liquid hydrocarbon is selected from the group consisting of gasoline, diesel fuel and heavy aromatic naphtha.

8. The reagent of claim 1 wherein the reagent is stable for at least one month when stored in a light-free environment.

9. A reagent consisting essentially of a 1,822–17,335 mg. per liter of chlorine dioxide dissolved in a non-aqueous, water-immiscible liquid hydrocarbon, said concentration being sufficient for disinfecting and sterilizing and wherein the chlorine dioxide in the non-aqueous, water-immiscible liquid hydrocarbon is stored at atmospheric pressure in a storage container which avoids exposure to light; and the reagent remains stable for at least seven days.

10. The reagent of claim 9, wherein the concentration of chlorine dioxide ranges from approximately 2,000 to 17,000 mg per liter of the non-aqueous, water-immiscible liquid.

11. The reagent of claim 9, wherein the reagent is stable for at least one month when stored in a light-free environment.

* * * * *